US009156957B2

(12) United States Patent
Gordon et al.

(10) Patent No.: US 9,156,957 B2
(45) Date of Patent: Oct. 13, 2015

(54) PUNCTURE-HEALING THERMOPLASTIC RESIN CARBON-FIBER-REINFORCED COMPOSITES

(71) Applicant: The United States of America as represented by the Administrator of the National Aeronautics and Space Administration, Washington, DC (US)

(72) Inventors: Keith L. Gordon, Hampton, VA (US); Emilie J. Siochi, Newport News, VA (US); Brian W. Grimsley, Smithfield, VA (US); Roberto J. Cano, Yorktown, VA (US); Michael W. Czabaj, Newport News, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/774,422

(22) Filed: Feb. 22, 2013

(65) Prior Publication Data
US 2014/0066553 A1 Mar. 6, 2014

Related U.S. Application Data

(60) Provisional application No. 61/602,717, filed on Feb. 24, 2012.

(51) Int. Cl.
| | |
|---|---|
| *C08K 3/04* | (2006.01) |
| *C08L 51/00* | (2006.01) |
| *C08J 5/04* | (2006.01) |
| *B32B 5/28* | (2006.01) |
| *C08K 7/06* | (2006.01) |

(52) U.S. Cl.
CPC . *C08J 5/042* (2013.01); *B32B 5/28* (2013.01); *C08K 7/06* (2013.01)

(58) Field of Classification Search
CPC .................................. C08J 5/042; C08K 7/06
USPC ........................................................ 524/495
See application file for complete search history.

(56) References Cited

U.S. PATENT DOCUMENTS

| | | | |
|---|---|---|---|
| 3,617,437 A | 11/1971 | Bagg et al. | |
| 3,884,895 A | 5/1975 | Eckert et al. | |
| 4,656,105 A * | 4/1987 | Kobayashi et al. | 429/213 |
| 5,344,689 A * | 9/1994 | Ide et al. | 428/114 |
| 6,222,007 B1 | 4/2001 | Cano et al. | |
| 6,379,799 B1 | 4/2002 | Almen | |
| 8,029,889 B1 | 10/2011 | Li et al. | |
| 2010/0221523 A1* | 9/2010 | Hood et al. | 428/318.4 |

OTHER PUBLICATIONS

Williams et al., Composites: Part A, 38, 1525-1532, 2007.*

Gordon et al., AIAA Infotech@Aerospace, Atlanta, Georgia, Apr. 2010.*

Kelly, L.G., "Composite Structure Repair," AGARD Report No. 716, 57th Meeting of the Structures and Materials Panel, Oct. 9-14, 1983, Vimeiro, Portugal.

Wu, D.Y., Muere, S. and D. Solomon, "Self-Healing Polymeric Materials: A Review of Recent Developments," Progress in Polymer Science, 2008, vol. 35, pp. 479-522.

St. Clair, T.L., Johnston, N.J. and Baucom, R.M., "High Performance Composites Research at NASA Langley," NASA TM 100518, 1988.

White, S.R., Sotto, N.R., Geubelle, P.H., Moore, J.S., Kessler, M.R., Sriram, S.R., Brown, E.N., Viswanathan, S., "Autonomic healing of polymer composites," Nature, Feb. 15, 2001, vol. 409, pp. 794-797.

J.W.C. Pang, I. P. Bond, "Bleeding composites'-damage detection and self-repair using a biomimetic approach," Composites Part A: Applied Science and Manufacturing, 2005. vol. 36(2), pp. 183-188.

Jody W. C. Pang, Ian P. Bond, "A hollow fibre reinforced polymer composite encompassing seif-healing and enhanced damage visibility," Composites Science and Technology, 2005, vol. 85 (11-12), pp. 1791-1799.

Carolyn Dry and William McMillan, "Three-part methylmethacrylate adhesive system as an internal delivery system for smart responsive concrete," Smart Materiais and Structures, 1996, vol. 5(3), pp. 297-300.

Manu John and Guoqiang Li, "Self-healing of sandwich structures with a grid stiffened shaped memory polymer syntactic foam core," Smart Materials and Structures, 2010, vol. 19, pp. 075013-075024.

Jones Nji and Guodiang Li, "A self-healing 3D woven fabric reinforced shape memory polymer composite for impact mitigation," Smart Materials and Structures, 2010, vol. 19, pp. 035007-035015.

Chen, X., Dam, M., Ono, K., Shen, H., Nutt, S., Sheran, K., Wudl, F., "A Thermally Re-Mendable Cross-Linked Polymeric Material", Science, 2002, vol. 295, pp. 1698-1702.

Shijing Cheng, Brian D. Mather and Timothy E. Long, "Taking Advantage of Non-Covalent interactions in the Design of Self-Healing Polymers", Polymer Preprints, 2008, vol. 49(1), 978-979.

Philippe Corder, Francois Tournilhac, Corinne Scuje-Ziakovic and Ludwik Leibler, "Self-healing and thermoreversible rubber from supramolecular assembly", Nature, 2008, vol. 451, pp. 977-980.

(Continued)

*Primary Examiner* — Hui Chin
(74) *Attorney, Agent, or Firm* — Jennifer L. Riley

(57) ABSTRACT

A composite comprising a combination of a self-healing polymer matrix and a carbon fiber reinforcement is described. In one embodiment, the matrix is a polybutadiene graft copolymer matrix, such as polybutadiene graft copolymer comprising poly(butadiene)-graft-poly(methyl acrylate-co-acrylonitrile). A method of fabricating the composite is also described, comprising the steps of manufacturing a pre-impregnated unidirectional carbon fiber preform by wetting a plurality of carbon fibers with a solution, the solution comprising a self-healing polymer and a solvent, and curing the preform. A method of repairing a structure made from the composite of the invention is described. A novel prepreg material used to manufacture the composite of the invention is described.

12 Claims, 5 Drawing Sheets

(56) References Cited

OTHER PUBLICATIONS

Judit Canadell, Han Goossens, and Bert Klumperman, "Self-Healing Materials Based on Disulfide Links", Macromolecules, 2011, vol. 44, pp. 2536-2541.

Burnworth, M., Tang, L., Kumpfer, J., Duncan, A., Beyer, F., Fiore, G., Rowan, S., Weder, C., "Optically healable supramolecular polymers", Nature, 2011, vol. 472, Apr. 21, 2011, pp. 334-337.

Deng, G., Tang, C., Li, F., Jiang, H., Chen, Y., "Covalent Cross-Linked Polymer Gels with Reversible Sol-Gel Transition and Self-Healing Properties", Macromolecules, 2010, vol. 43, pp. 1191-1194.

Lantman, C.W., MacKnight, W.J., Lundberg, R.D., "Structural Properties of Ionomers", Annual Rev. Mat., 1989, vol. 19, pp. 295-317.

Hird, B., Eisenberg, A., "Sizes and Stabilities of Multiplets and Clusters in Carboxylated and Sulfonated Styrene Ionomers," Macromolecules, 1992, vol. 25, No. 24, pp. 6466-6474.

Stephen J. Kalista, Jr., and Thomas C. Ward, "Thermal characteristics of the self-healing responses in poly(ethylene-co-methacrylic acid) copolymers," Journal of the Royal Society Interface, 2007, vol. 4, pp. 405-411.

Rebecca Fall, thesis entitled, "Puncture Reversal of Ethylene Ionomers-Mechanistic Studies," submitted to the faculty of Virginia Polytechnic Institute and State University, Blacksburg, VA, Aug. 29, 2001.

Rudy J. Wojtecki, Michael A. Meador, and Stuart J. Rowan. "Using the dynamic bond to access macroscopically responsive structurally dynamic polymers," Nature Materials, Jan. 2011, vol. 10, pp. 14-27.

Zhang, Ming, Q. Rong, Min, Z., and Yin, T., "Self-Healing Polymers and Polymer Composites," vol. 1, ISBN-10, 0470497122, ISBN-13:978-0470497128 (retrieved on Nov. 11, 2013). Retrieved from the Internet. http://media.johnwiley.com.

Wool, R.P., Polymer interfaces: Structure and Strength (Hanser/Gardner, Munich 1995), Chapter 11 pp. 398-444, Chapter 12, pp. 445-479.

Cano, Roserto, Johnston, N.J. and Marchello, J., "Solution Prepegging Quality Control," 40th SAMPE Symposium and Exhibition, Anaheim, CA, May 1995.

Soutis, C. and Lee, J. "A Study on the Compressive Strength of Thick Carbon Fiber-Epoxy Laminates," Composite Science and Technology, 2007, vol. 67 (10), pp, 2016-2025.

Dry, C., "Passive Turneable Fibers and Matrices," International Journal of Modern Physics B, 1992, vol. 6, No. 15 & 16, pp. 2763-2771.

Meure, S., Furman, S. and Khor, S.. "Poly[ethylene-co-(methacrylic acid)] Healing Agents for Mendable Carbon Fiber Laminates" Macromolecular Materials Engineering, 2010, vol. 295, pp. 420-424.

Chen, X. Wudl, F., Ajit K. M., Hongbin, S. and Butt, S., "New Thermally Remendable Highly Cross-Linked Polymeric Materials," Macromolecules, 2003, vol. 36, pp. 1802-1807.

Smith, J., "An Assessment of Self-Healing Fiber Reinforced Composites," NASA/TM-2012-217325.

Varley, Russell, J. and Van Der Zwaag, Sybrand, "Towards an Understanding of Thermally Activated Self-Healing of an Ionomner System During Ballistic Penetration," Acta Materialia, 2008, vol. 56, pp. 5737-5750.

Varley, Russell, J. and Van Der Zwaag, Sybrand, "Autonomous Damage Initiated Healing in a Thermo-Responsive Ionomer," Polymer International, 2010, vol. 59, pp. 1031-1038.

* cited by examiner

PUNCTURE-HEALING THERMOPLASTIC RESIN CARBON-FIBER-REINFORCED COMPOSITES

CROSS-REFERENCE TO RELATED APPLICATION

This patent application claims the benefit and priority of U.S. Provisional Application Ser. No. 61/602,717, filed Feb. 24, 2012, the contents of which are hereby incorporated by reference in their entirety.

STATEMENT REGARDING FEDERALLY SPONSORED RESEARCH AND DEVELOPMENT

This invention was made by employees of the United States Government and may be manufactured and used by or for the Government of the United States of America for governmental purposes without the payment of any royalties or therefor.

FIELD OF THE INVENTION

The present invention relates generally to the field of damage- and impact-tolerant carbon-fiber-reinforced composites ["CFRCs"] and more particularly to damage- and impact-tolerant CFRC structures for structural aerospace applications.

BACKGROUND OF THE INVENTION

CFRCs are known in the art. They generally comprise a matrix, such as a polymer resin, for example an epoxy or other polymer, and a reinforcement of carbon fibers. The carbon fibers might also contain other fibers, such as aluminum or glass. Structures of various aerospace applications are often made in whole or in part of CFRC.

The initiation and propagation of damage ultimately results in failure of aerospace structural components. Typical structural repairs often result in damaging practices, where material is ground away and holes are drilled to secure patches, which can act as new sites for damage. By healing known damage or by providing healing material to areas that are suspected to incur damage, improved safety can be realized. Damage-tolerant, self-healing structural systems provide a route towards this objective. Effective self-repair, however, requires that these materials heal quickly following low- and mid-velocity impacts, while retaining structural integrity. Although there are materials known to possess this characteristic, such is not the case for structural engineering systems.

Self-healing materials display the unique ability to mitigate incipient damage and have built-in capability to substantially recover structural load transferring ability after damage. Structures that make use of self-healing engineering materials produce a healing response from a change in the material's chain mobility as a function of the damage mechanism/condition involved. This type of material will possess better mechanical properties, healing capability at elevated temperatures, faster healing rates (less than 100 microseconds), and healing without the need of foreign inserts or fillers (via structural chemistry). These materials might have application as structural aerospace applications.

In recent years, researchers have studied different "self-healing mechanisms" in materials as a collection of irreversible thermodynamic paths where the path sequences ultimately lead to crack closure or resealing. Crack repair in polymers using thermal and solvent processes, where a healing process triggered with heating or with a solvent has been studied. A second approach involves the autonomic healing concept, where healing is accomplished by dispersing a microencapsulated healing agent and a catalytic chemical trigger within an epoxy resin to repair or bond crack faces and mitigate further crack propagation. A related approach, the microvascular concept, utilizes brittle hollow glass fibers in contrast to microcapsules filled with epoxy hardener and uncured resin in alternate layers, with fluorescent dye. An approaching crack ruptures a hollow glass fiber, releasing a healing agent into the crack plane through capillary action. A third approach utilizes a polymer that can reversibly re-establish its broken bonds at the molecular level by either thermal activation (e.g., based on Diels-Alder rebonding), or ultraviolet light. A fourth approach, structurally dynamic polymers, are materials that produce macroscopic responses from a change in the materials' molecular architecture without heat or pressure. A fifth approach, self-healing fiber-reinforced composites, involves integrating self-healing resins into fiber reinforced composites. Various chemistries have been used based on some of the aforementioned approaches described above. Although significant recovery (>90 percent) of virgin neat resin material properties have been reported, this range has not been the case for fiber-reinforced composites made from them.

The aforementioned self-healing approaches that address the repair or mitigation of crack growth and various damage conditions in materials, have the following disadvantages: (1) Slow rates of healing; (2) Use of foreign inserts in the polymer matrix that may have detrimental effects on composite performance; (3) Samples have to be held in intimate contact or under load and/or fused together under high temperature for long periods of time; and (4) The material may not be considered a structural load-bearing, material.

For example, ionomers containing ionic groups at low concentrations (<15 mol percent) along the polymer backbone. In the presence of oppositely-charged ions, these ionic groups form aggregates that can be activated by external stimuli such as temperature or ultraviolet irradiation. One such ionomer, poly(ethylene-co-methacrylic acid) [EMAA], also known under the trade name Surlyn®, undergoes puncture reversal (self-healing) following high-velocity ballistic penetration. The heat generated from the damage event triggers self-healing in this material. Although EMAA polymers possess excellent puncture healing properties, their low tensile modulus (308 MPa) limits their use as an engineering polymer in structural aerospace applications.

Also, a self-healing composite laminate system that possesses aerospace quality consolidation with fiber volume fraction (FVF) of up to 57 percent and void volume fraction of less than two percent does not currently exist. Most self-healing composite laminates that have been reported possess 20-30 percent fiber volume, which is well below aerospace industrial standards for fiber-reinforced composites (FRC).

A need exists for an inherently self-healing composite laminate matrix that does not rely on foreign inclusions for self-repair and which has mechanical properties with potential for aerospace applications. A need further exists for an appropriate process for making such a matrix, for an appropriate process for making CFRCs from such a matrix, and for repairing such CFRCs.

SUMMARY OF THE INVENTION

A composite comprising a combination of a polybutadiene graft copolymer matrix and a carbon-fiber reinforcement is provided. Additionally, a method of fabricating a composite comprising the steps of manufacturing a pre-impregnated unidirectional carbon fiber preform by wetting a plurality of carbon fibers with a solution, the solution comprising a self-healing polymer and a solvent, and curing the preform, is provided. Moreover, a method of repairing a damage composite of the invention is provided. Other features and advantages will become apparent upon a reading of the attached specification, in combination with a study of the drawings.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

Figure 1:
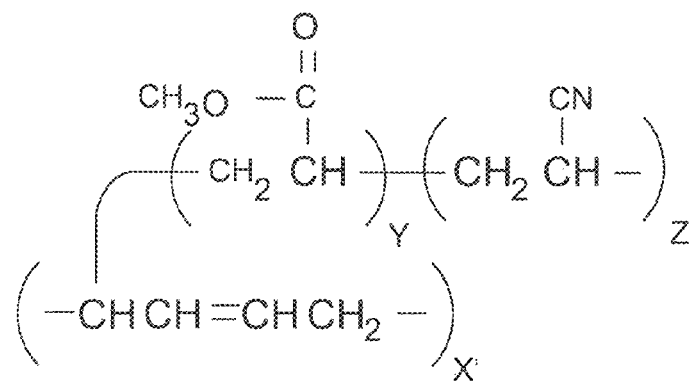
FIG. 1 is a diagram of the chemical structure of the polybutadiene graft copolymer of the preferred embodiment of the invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

In one embodiment, a polybutadiene graft copolymer (PBg) was selected as a matrix in carbon-fiber-reinforced composites due to its higher mechanical and thermal properties as compared to the other self-healing thermoplastics which have been studied. According to material suppliers, PBg has a glass transition temperature $(T_g)$=80 degrees Celsius (° C.), room temperature (RT) tensile strength of 37 MPa, RT tensile modulus of 2.47 GPa, and a 7.5 percent elongation at break. The tensile modulus of the neat polymer is about 10 percent lower than the 2.76 GPa required of matrix polymers typically used in aerospace primary structural applications. In one embodiment, the matrix is a polybutadiene graft copolymer matrix, such as a polybutadiene graft copolymer comprising poly(butadiene)-graft-poly(methyl acrylate-co-acrylonitrile). In an embodiment, the self-healing polymer comprises poly(butadiene)-graft-poly(methyl acrylate-co-acrylonitrile). In some embodiments, the matrix is a soluble matrix that allows for processing of the self-healing thermoplastic composite. In further embodiments, the solvent used to process the matrix is N-methylpyrrolidone.

Structures using self-healing polymer matrices such as, for example, PBg provide the following advantages: (1) increased damage tolerance compared to thermosetting polymer matrices which incur a greater extent of impact damage as compared to PBg composites, based upon C-scan data; (2) Self-repairing polymer matrices provide a route for recovery of a large proportion of the pristine mechanical properties, thus extending the life of the structure; (3) Since self-healing is an intrinsic property of the matrix material, this matrix can be treated a direct substitute to conventional thermosetting matrices that do not possess self-healing characteristics; (4) The intrinsic healing of PBg does not require the introduction of microcapsules needed by other healing polymer matrices described in the prior art section; it therefore has the advantage of not needing microcapsules which can act as defect initiators in the composite; (5) As long as there is no loss of matrix material incurred in the damage event, PBg can self-heal repeatedly, compared to the microcapsule approach, where healing is limited by the amount of monomer present at the site where damage occurs. In some embodiments, the self-healing polymer is able to heal crack(s) and/or puncture(s) in the structure.

A composite fabrication process cycle was developed from composite precursor materials to fabricate composite laminates for aerospace structures. The precursor material is a pre-impregnated unidirectional carbon-fiber preform, also known as a prepreg. In the prepregging process, the high-strength, structural reinforcing IM7 carbon fiber is wetted by a solution containing the self-healing PBg polymer dissolved in N-Methylpyrrolidone (NMP). Precursor materials in the form of unidirectional prepreg are widely used in the aerospace industry to fabricate and manufacture aerospace composite structures for both commercial and military aviation and space launch vehicle systems. The experimental prepreg containing the puncture-self-healing polymer PBg was characterized and a cure cycle developed to be used in fabrication of composite laminate test coupons from this novel prepreg material.

A self-healing thermoplastic PBg, poly(butadiene)-graft-poly(methyl acrylate-co-acrylonitrile), a polybutadiene graft copolymer, was obtained in pellets from Sigma-Aldrich. The chemical structure of this PBg is shown in FIG. 1. Initially CFRC processing attempts with the PBg thermoplastic were conducted using IM7-6K 5-harness satin woven fabric (GP sizing, 280 gsm) from Textile Products, Inc., Anaheim, Calif., USA. Experimental batches of PBg prepreg were developed using IM7-12K unsized fiber tow from Hexcel and anhydrous N-Methylpyrrolidone ("NMP") solvent supplied by BASF Chemical Co, Florham Park, N.J. Quasi-isotropic panels were fabricated for the purpose of consolidation quality comparison using Cycom® IM7/977-3 prepreg supplied by Cytec Engineered Materials, Woodland Park, N.J.

As a first step in determining the CFRC processing temperature window, the glass transition ($T_g$) of the PBg polymer pellets was verified by conducting a dynamic temperature scan in nitrogen from 25° C. to 300° C. at 5° C./min in a Netzsch 204-F1 Phoenix® differential scanning calorimeter (DSC). In addition to the dynamic scan in DSC, dynamic temperature scans in nitrogen from 25° C. to 300° C. at 5° C./min were conducted using a Netzsch TG-209-F1 Libra® thermo-gravimetric analyzer (TGA) to determine the decomposition temperature of the pristine PBg polymer.

Residual solvent content in IM7/PBg prepreg was obtained from end-roll specimens of the prepreg batch, designated tape machine run # (TM-341), using a dynamic temperature scan from a thermo-gravimetric analyzer (TGA) under a nitrogen purge from 25° C. to 300° C. at five ° C./min. The TGA was a Netszch TG-209-F1 Libra® TGA. This data was also used to determine the temperature which would be required to remove the volatiles (NMP) from the IM7/PBg prepreg during CFRC processing. Using these results to initially select an isothermal dwell temperature in the CFRC processing prior to the compaction step, the time duration of this proposed dwell was determined by performing an isothermal scan at 150° C. and 225° C. in TGA of the IM7/PBg prepreg. Using a specimen from the TM341 roll of IM7/PBg prepreg, the mass evolution of the material during the proposed CFRC process cycle was determined in the Netzsch TGA by heating to 150° C. at 5° C./min and holding for one hour under nitrogen purge and then heating from 150° C. to the mold compaction temperature of 225° C. at five ° C./min and holding for two hours.

The PBg polymer was molded into neat resin disks 2.54 cm in diameter by 1.5 millimeters (mm) in thickness for rheological characterization in a Rheometrics ARESV® parallel plate rheometer. All of the rheology results presented in this study were collected using a cyclic strain of two percent. A dynamic temperature scan in nitrogen was conducted from 25° C. to 285° C. at 5° C./min. Based on the results of the TGA thermogram, an isothermal temperature scan at 150° C. and 225° C. was performed on the solution of NMP containing 31 percent solids PBg to determine the change in the dynamic viscosity as the matrix material devolatilizes during the proposed processing cycle.

Pellets of the PBg polymer were dissolved in anhydrous NMP by continuously stirring for 48 hours at 25° C. under nitrogen purge. The resulting uniform mixture contained 31 percent solids in NMP by weight. The Brookfield viscosity of the resulting solution at 25° C. was determined to be 21.12 Pa*sec (211.20 poise). This viscosity was acceptable for the solution prepregging process. Two experimental batches of PBg prepreg were fabricated with prepregging equipment. The 22 to 25 centimeters (cm) wide prepregs were fabricated using 90 unsized IM7-12K tows by introducing the PBg-NMP polymer in solution to the unsized IM7 fiber via the dip tank in the prepregging process. Using an established procedure of weighing, oven drying, and reweighing samples of the prepreg, the resulting fiber areal weight (FAW), PBg resin and NMP solvent content of these two experimental batches were determined.

The processing cycle determined following the above tests was then used to fabricate three [45/0/-45/90]$_{4S}$ IM7/PBg panels including geometries of 7.6 cm×7.6 cm, 15.2 cm×15.2 cm, and 30.5 cm×30.5 cm. Material from the first prepreg batch was processed in stainless steel closed molds using a TMP® three-ton vacuum press with a layer of breather and release cloth separating the stack of prepreg from the stainless steel mold base and plunger. A 15.2 cm×15.2 cm [45/0/-45/90]$_{4S}$ panel was fabricated in the same mold and vacuum press using Cytec IM7/977-3 toughened epoxy prepreg and the Cytec recommended processing cycle, C-49. Both the IM7/PBg and the IM7/977-3 15.2 cm×15.2 cm panels were cross-sectioned at the center using a wet saw and then potted and polished for optical microscopy in a Reichert MEF4 M microscope. Following ASTM D3171, FVFNVF analysis by acid digestion were conducted for this IM7/PBg panel and three subsequently processed 15.2 cm×15.2 cm IM7 PBg panels. Based on these results, six additional [45/0/-45/90]$_{4S}$ 15.2 cm×15.2 cm IM7/PBg panels were fabricated from prepreg batch (TM-340) and six from prepreg batch (TM-341) in the vacuum press for the purpose of determining the compression after impact (CAI) strength of these composite materials after low-velocity impact damage.

Nine IM7/PBg panels were prepared as test coupons and subjected to low-velocity impact according to ASTM D7136. A spherical tup was used to impact each 15.2 cm×10.1 cm coupon at the center. The average coupon thickness of the six panels fabricated from prepreg batch TM340 was 5.40 mm, and an impact energy of 36.08 J was used to damage these coupons. The six panels fabricated from prepreg batch TM-341 had an average thickness of 4.62 mm. Four of these six panels were damaged using an impact energy of 31.09 J. Non-destructive evaluation (NDE) by through-transmission, time-of-flight c-scan of these impacted panels was conducted using a Sonotek® c-scan with a 10 MHz transducer. After c-scan of all of the damaged coupons, one of the coupons from the panels fabricated using the TM-340 prepreg batch and three of those fabricated using the TM-341 batch were randomly selected and subjected to an elevated temperature/ pressure healing cycle in the vacuum press using the following cycle:

25° C. to 225° C. at five ° C./min under full vacuum;
hold at 225° C. for 30 minutes under full vacuum and 1.7 MPa pressure; and
cool down the vacuum press to 25° C. at five ° C./min under full vacuum. In some embodiments, the vacuum press is cooled such that the sample cools slowly while still under full vacuum.

Both pristine and damaged IM7/PBg quasi-isotropic laminates were tested according to ASTM D7137 using a CAI test fixture in an MTS 250KN Load Frame. In addition, the pristine compression strength of the IM7/PBg was determined by mounting these pristine 15.2 cm×10.1 cm coupons in the CAI fixture and loading them in axial compression.

Figure 2:
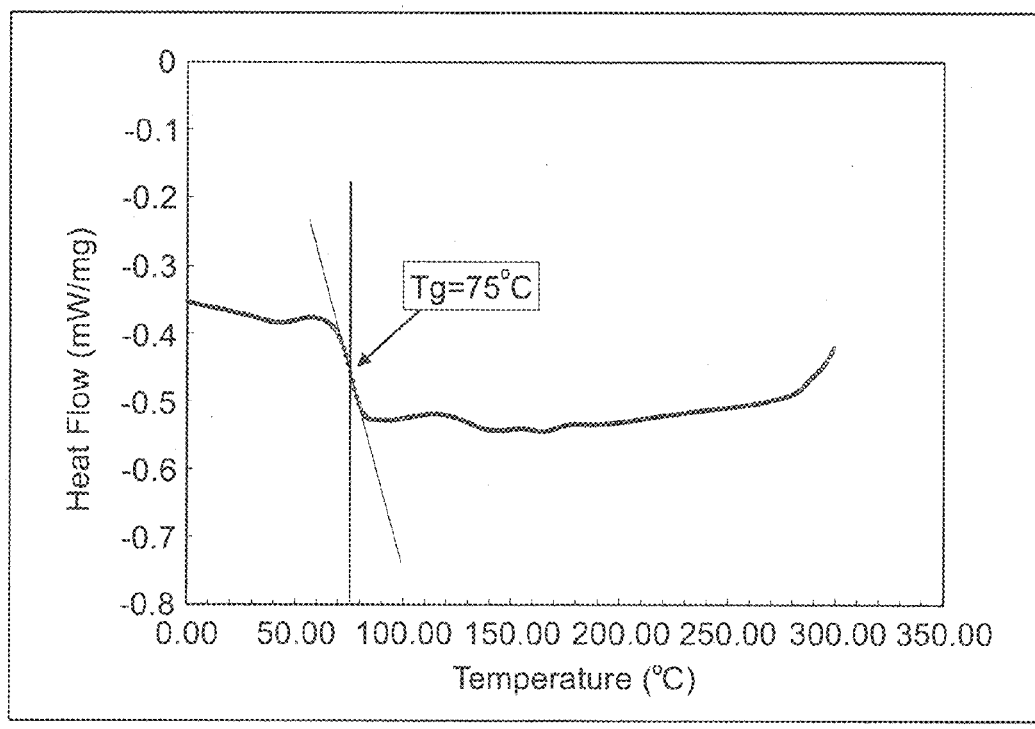
FIG. 2 is a graph of a differential scanning calorimeter (DSC) scan of pristine polybutadiene graft copolymer (PBg) amorphous thermoplastic.

The $T_g$ of the polymer was determined at the inflection in the heat vs temperature curve shown in FIG. 2. This measured value of 75° C. is very close to the vendor-specified value of 80° C. A significant reduction in the modulus of the polymer is associated with this transition. For example, the tensile modulus of the PBg polymer at 25° C. of 2.5 GPa is reduced to 2.2 MPa at 100° C. as reported by the material supplier.

Figure 3:
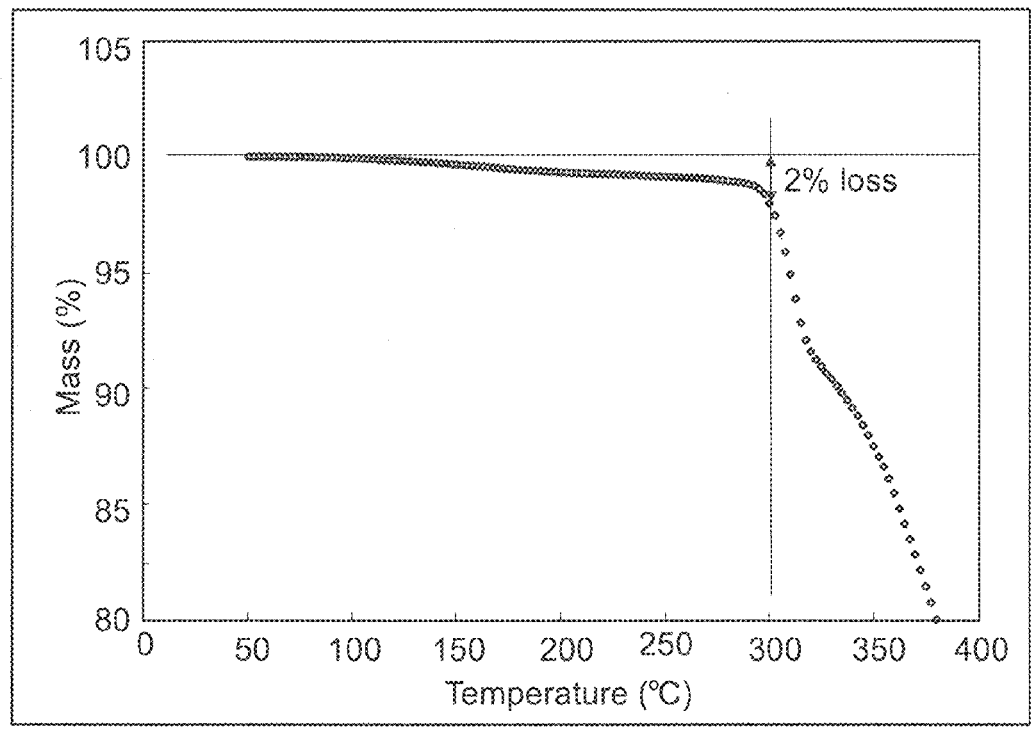
FIG. 3 is a graph of dynamic temperature taken using a thermo-gravimetric analyzer (TGA) of pristine PBg amorphous thermoplastic.

The results of the dynamic temperature scan in TGA shown in FIG. 3 indicates a pristine PBg sample mass loss of 2 percent at 300° C. as the decomposition temperature and indicates that the polymer can be processed at temperatures up to about 300° C. without significant degradation.

Figure 4:
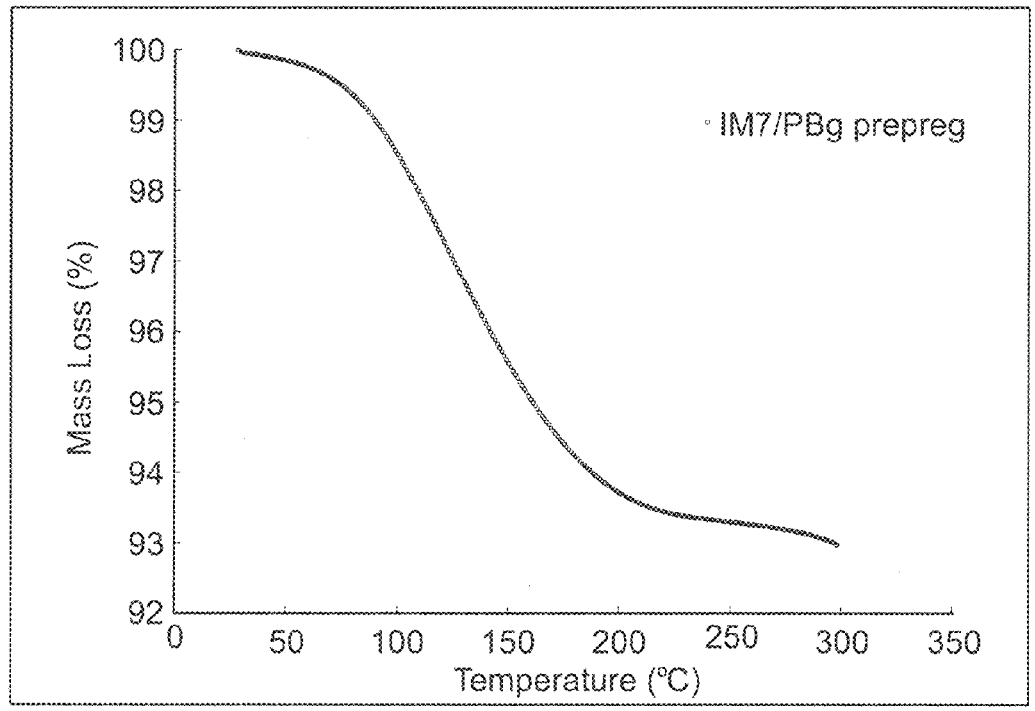
FIG. 4 is a graph of mass evolution in dynamic temperature TGA scan of structural reinforcing IM7 carbon fiber (IM7)/PBg prepreg containing anhydrous N-Methylpyrrolidone (NMP) solvent.

Residual solvent trapped in the prepreg will result in composite parts with high void content. The thermogravimetric scan shown in FIG. 4 indicates that about 7 percent solvent evolved from the prepreg between 100° C. and 200° C.

Figure 5:
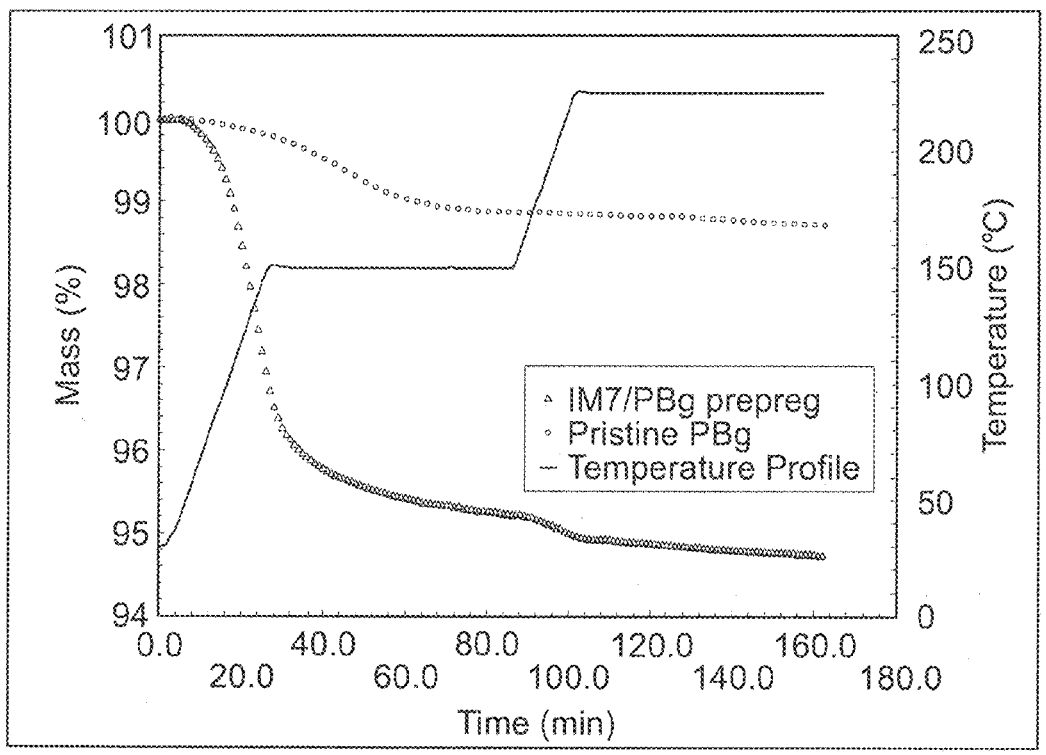
FIG. 5 is a graph of isothermal mass evolution of pristine PBg and IM7/PBg prepreg.

Using these results, an isothermal dwell temperature of 150° C. in the CFRC processing cycle was initially selected to devolatilize the IM7/PBg prepreg prior to the compaction step at 225° C. The temperature of 150° C. also coincides with the reduced viscosity determined by rheological analysis. The time required in the proposed devolatilization dwell was investigated by isothermal TGA of the IM7/PBg prepreg. Shown in FIG. 5 are the mass evolution of both the pristine PBg polymer from pellet and the IM7/PBg prepreg during the proposed one-hour isothermal drying step at 150° C., as well as the two-hour compaction step at 225° C. The isothermal TGA scans in FIG. 5 indicate a mass loss of one percent in the pristine PBg polymer after one-hour hold at 150° C., while the IM7/PBg prepreg lost up to 5 percent mass. This result indicates a net devolatilization of NMP solvent of about 4 percent by weight leaving a possible residual six percent by weight (w) solvent in the prepreg, based on the total amount of solvent left in the prepreg after the prepregging process, going into the temperature ramp to the compaction and consolidation step at 225° C. This level of solvent content could result in void entrapment during the compaction phase. The high viscosity of the PBg polymer might prevent the full removal of NMP, regardless of the devolatilization step duration.

Figure 6:
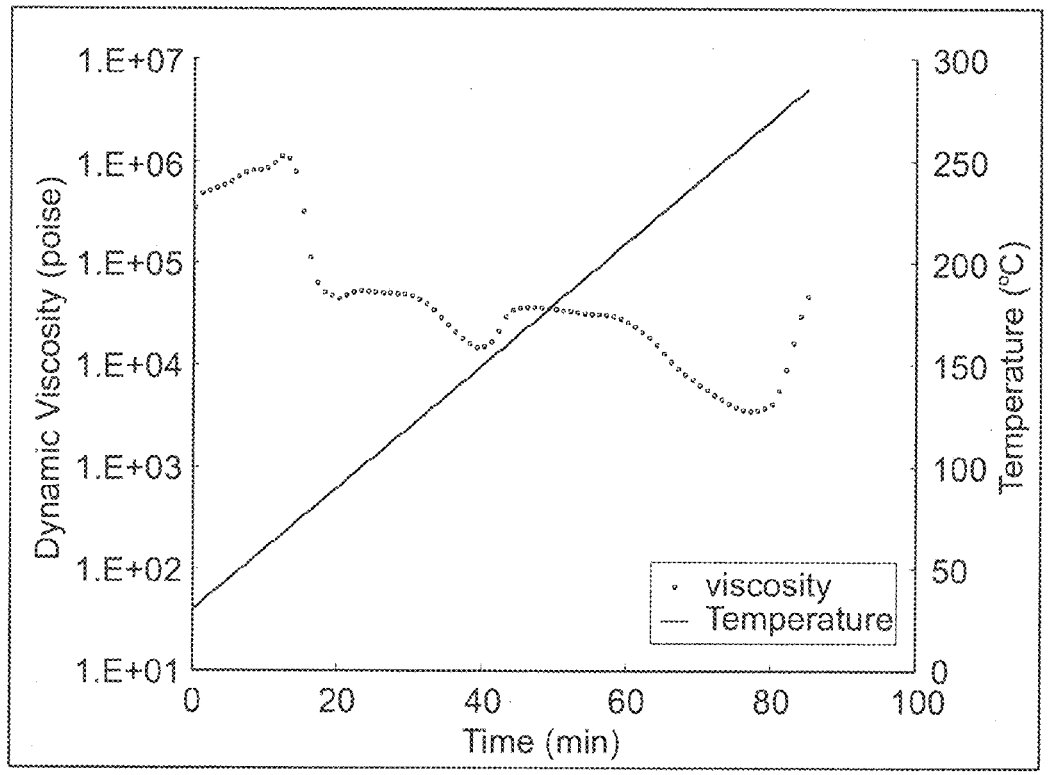
FIG. 6 is a dynamic temperature viscosity profile of the pristine PBg thermoplastic.

Having determined the $T_g$ and the decomposition temperature of the PBg polymer, the CFRC processing temperature window exists between about 75° C. and about 300° C. Thermoplastic polymers are typically difficult to process as matrix in CFRC because the long molecular chains of these polymers make the bulk material highly viscous. Knowing the thermal processing window, the dynamic viscosity versus temperature of the PBg polymer was determined via parallel plate rheology. The dynamic-temperature rheology scan in FIG. 6 indicates that the PBg polymer exhibits two separate events where the heat introduced to the material results in significant reduction of the dynamic viscosity, $\eta^*$. Following the stick-slip phenomenon in the first 20 minutes of the test, the first event occurs near 150° C. where the dynamic viscosity decreased from a maximum of 5,000 Pa*sec (50,000 poise) to 1,500 Pa*sec (15,000 poise). The second event occurs at about 260° C. where the PBg polymer reaches its minimum dynamic viscosity of 360 Pa*sec (3,600 poise). However, the rapid increase in the viscosity at temperatures above about 275° C., combined with the two percent mass loss observed in TGA indicates that the polymer is beginning to degrade at this elevated temperature. Therefore a maximum molding temperature of 225° C. with viscosity of 1,300 Pa*sec (13,000 poise) was selected to process the PBg as matrix in CFRC composites.

Figure 7:
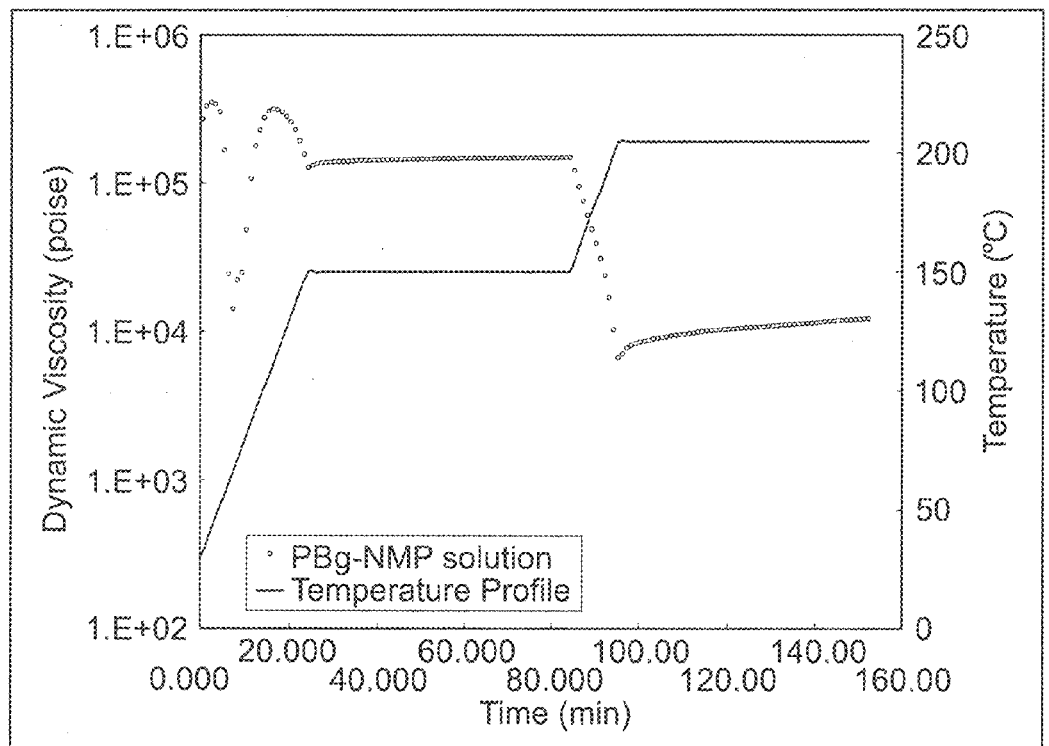
FIG. 7 is a graph of the isothermal temperature and dynamic viscosity of PBg-NMP solution.

After determining the mass evolution in TGA of the IM7/PBg prepreg during the proposed CFRC processing devolatilization step at 150° C. and compaction step at 225° C., the effect of these processing dwells on the dynamic viscosity of the PBg polymer was investigated in parallel plate rheology. The results of this isothermal temperature scan performed using the PBg-NMP prepregging solution are shown in FIG. 7. During the isothermal hold at 150° C. the PBg containing residual NMP exhibited a relatively stable viscosity of 1,500 Pa*sec (15,000) poise. A significant decrease in dynamic viscosity was observed during the five ° C./min temperature ramp to 225° C. During the 60-minute hold at 225° C., the viscosity of the material was less stable, increasing from 6,700 poise at the beginning to 12,300 poise by the end of the isothermal hold. The change in viscosity may be due to devolatilization of the NMP solvent, which has a boiling point of 200° C. at atmospheric pressure or the increase may be due to some initial degradation of the PBg molecule.

Figure 8:
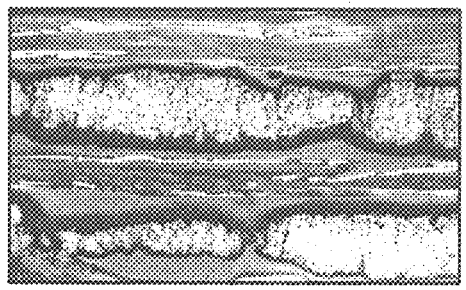
FIG. 8 is a photomicrograph at 50× of IM7 5-harness satin biaxial/PBg matrix composite by resin film infusion (RFI).

The resin film infusion (RFI) process is preferable to alternative methods that require an intermediate step of pre-impregnating carbon fiber tows with resin. However, the photomicrograph in FIG. 8 shows that this method was not suitable for PBg.

It is noted that the PBg resin was able to flow around the IM7-6K fiber tows in the biaxial fabric, but does not penetrate the tows. In fact the tows which are 90-degrees to the plane are clearly surrounded by a region of voids. Based on these results, the effort to fabricate CFRC with PBg thermoplastic matrix focused on the development of a processing method with an intermediate prepreg material.

Two experimental batches of PBg prepreg were fabricated using prepregging equipment. The fiber areal weight (FAW), PBg resin and NMP solvent content of these two

TABLE 1

Characteristics of NASA LaRC IM7/PBg unidirectional prepreg.

| Run Number | Resin Viscosity, Poise | FAW, g/m² | Resin Content, wt % Dry | Solvent Content, wt % Wet | Width, cm | Length, m |
|---|---|---|---|---|---|---|
| TM-340 | 210 | 159 | 41-43 | 15-20 | 25 | 66 |
| TM-341 | 211 | 146-150 | 34-35 | 10-11 | 22 | 59 | experimental batches are displayed in Table 1.

Based on the results obtained in the thermal and rheological analysis of the IM7/PBg experimental prepreg, the processing cycle in the vacuum press for the IM7/PBg composite was selected to be:
1. 25° C. to 150° C. at two ° C./min under full vacuum, hold at 150° C. under full vacuum for 60 minutes;
2. 150° C. to 225° C. at two ° C./min under full vacuum, hold at 225° C. for 60 minutes under full vacuum and 1.7 MPa compaction pressure during entire temperature hold;
3. Cool down to 25° C. at two ° C./min under full vacuum.

Using these conditions, three $[45/0/-45/90]_{4S}$ panels measuring 7.6 cm×7.6 cm, 15.2 cm×15.2 cm, and 30.5 cm×30.5 cm were fabricated. Upon visual inspection, all three of these panels exhibited higher consolidation quality than the previous RFI panels. Both the IM7/PBg and the IM7/977-3 15.2 cm×15.2 cm panels were cross-sectioned at the center using a wet saw and then potted and polished for photo microscopy. The resulting images are shown side-by-side for comparison in FIG. 9.

Figure 9A:
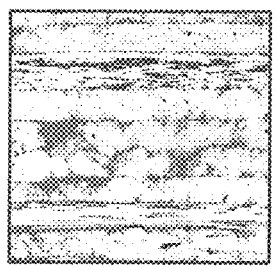
FIG. 9A is an optical micrograph at 100× of IM7/PBg.
Figure 9B:
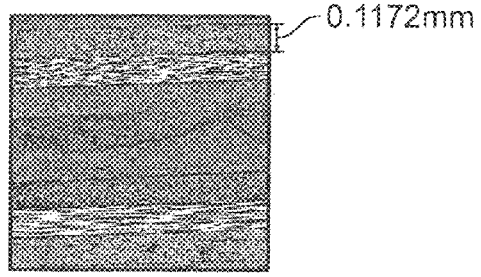
FIG. 9B is an optical micrograph at 100× of IM7/977-3.

The micrographs in FIG. 9 of the center plies of the 32-ply quasi panels indicate that the IM7/977-3 composite was very well consolidated and essentially void free, or consistent with VVF less than two percent. The plies had uniform thickness of 0.127 mm and the fibers were uniformly dispersed with the epoxy matrix in each of the plies. The micrograph of the IM7/PBg composite at the same stack location show that the plies were fairly uniform with an average thickness of about 0.183 mm, but there were some resin fiber discontinuities, or resin-rich regions. There were several small voids evident in this small sampling of the overall composite. Photomicrographs of additional IM7/PBg composites also contained voids, especially near panel edges. These were likely formed by the NMP volatiles trapped in the highly viscous polymer. Void content analysis by acid digestion, using a polymer density of 1.31 g/cc, of three subsequent 32 ply quasi-isotropic 15.2 cm×15.2 cm IM7/PBg panels revealed an average FVF>60 percent, and average VVF<two percent. Based on these results, additional IM7/PBg panels from both experimental batches of prepreg were fabricated in the vacuum press for the purpose of determining the compression after impact (CAI) strength of these novel composite materials.

Figure 10A:
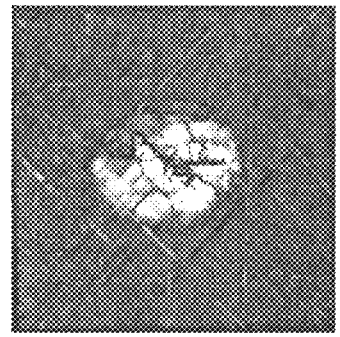
FIG. 10A is a through-transmission c-scan of IM7/PBg panel post-impact.

Nine IM7/PBg panels were subjected to low-velocity impact resulting in an average damage dent depth of 1.9 mm (0.075 in). The damage regions of all the impacted coupons were analyzed by c-scan. A representative image of the damage incurred in the IM7/PBg panels is shown in FIG. 10A. NDE of these IM7/PBg coupons indicated an average planar delamination area of 15.3 cm². The damage area and dent depth are consistent with barely visible impact damage (BVID).

Figure 10B:
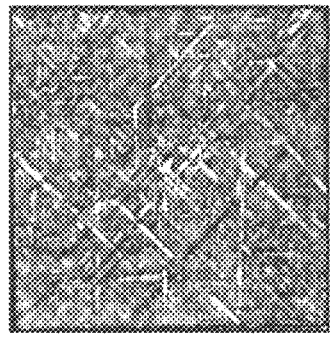
FIG. 10B is a through-transmission c-scan of the panel of FIG. 10A, post-healing cycle.

Four of the BVID IM7/PBg panels were subjected to an elevated temperature/pressure healing cycle described above and then tested to failure in compression to determine the influence of the cycle on the IM7/PBg composite CAI failure strength. The time-of-flight c-scan image of one of these IM7/PBg panels before and after, healing is shown in FIGS. 10A and 10B. As a result of the elevated temperature/pressure healing cycle, no apparent damage was evident in the c-scan. After the healing cycle, the 1.9 mm deep dent on the surface of the panel was no longer visible.

Figure 11:
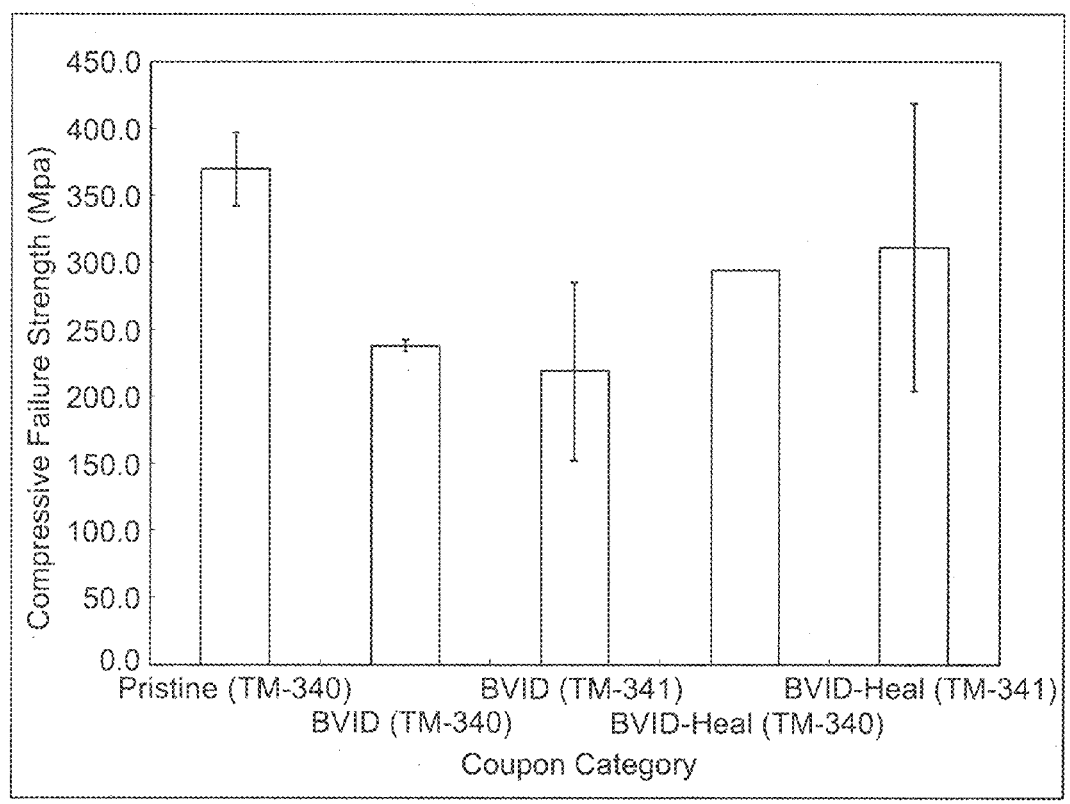
FIG. 11 is a graph of IM7/PBg testing results of pristine coupon compression, barely visible impact damage (BVID) coupon compression after impact (CAI) and BVID-Healed coupon compression prepared from two batches of experimental prepreg (TM340 and TM341).

The results of the axial compression of the two pristine IM7/PBg coupons, the five BVID coupons and the four BVID coupons subjected to an elevated temperature/pressure healing cycle are shown in FIG. 11.

All of the coupons failed due to fiber micro-buckling. In the five BVID coupons, this failure initiated at the site of the impact damage and propagated across the width of the coupons. The four IM7/PBG coupons containing BVID which were subjected to an elevated temperature/pressure healing cycle also failed due to fiber microbuckling initiating at the original impact site and propagating across the 10.2 cm width of the coupons. The pristine compressive strength resulting from this limited sample of coupons of quasi-isotropic laminates was about 52 percent of the compressive strength of the 675 MPa reported for a typical toughened epoxy 32-ply quasi-isotropic CFRC intended for aerospace structure.

The CAI strength of the BVID coupons appears to be independent of the prepreg batch. This is expected since the failure of these coupons is dominated by the impact damage and in this study the impact energy used for BVID was varied to account for the panel thickness variation resulting from prepreg batch inconsistency. The inconsistency of the prepreg batches was not of significant concern at this initial phase in the study given that all of the IM7/PBg prepreg were considered experimental. The differences in the batch to batch quality is noted in Table 1 and demonstrates that there is considerable room for improvement in both the quality of the prepreg and the resulting mechanical performance of CFRC panels fabricated from the intermediate material. In addition to the inconsistencies in the experimental prepreg, the fiber/matrix interface is not optimized with fiber sizing used to optimize the interfacial adhesion in toughened epoxy CFRCs.

Regardless of prepreg batch, there was a significant improvement in the failure strength of the BVID coupons subjected to an elevated temperature/pressure healing cycle vs the BVID panels which were not healed. The TM340 batch of damaged IM7/PBg panels exhibited a 64 percent retention of compressive strength. The retention of compressive strength of coupons fabricated from this same batch of prepreg, which were subjected to BVID and then the elevated temperature/pressure healing cycle was found to be 80 percent. However, the large error associated with the BVID-Heal coupons from the second prepreg batch (B2) indicates that this notable improvement in compressive strength may be just as dependent on the quality of the CFRC laminate as it is on the healing capability of the matrix. The non-autonomic healing cycle utilized in this initial study amounts to reprocessing of the amorphous thermoplastic PBg matrix in the IM7/PBg composite.

The composite of the present invention will be useful for structures in applications such as, but not limited to, structural components that can be incorporated into vehicles such as aircraft, rotorcraft, and spacecraft. Particular applications that can include these structural components are by way of example and not limitation, combat aircraft, large military transport and bomber aircraft, commercial transport, small transport, general aviation, military rotorcraft, commercial and general aviation rotorcraft, spacecraft, and missiles.

While preferred embodiments of the present invention are shown and described, it is envisioned that those skilled in the art may devise various modifications of the present invention without departing from the spirit and scope of the appended claims.

What is claimed is:

1. A composite comprising a combination of a self-healing polymer matrix and a carbon-fiber reinforcement, wherein the composite is fabricated from an intermediate prepreg material, wherein the composite does not comprise microcapsules containing a healing agent, nor hollow glass fibers containing a healing agent, and wherein the composite exhibits an average fiber volume fraction (FVF) of greater than 60%.

2. The composite of claim 1, wherein the polymer comprises a polybutadiene graft copolymer.

3. The composite of claim 2, wherein the polybutadiene graft copolymer comprises poly(butadiene)-graft-poly(methyl acrylate-co-acrylonitrile).

4. The composite of claim 1, wherein the carbon-fiber areal weight (FAW) of the intermediate prepreg material is between 146-150 g/m² and wherein the polymer content of the intermediate prepreg material is 34-35% wt.

5. A structural component for a vehicle comprising the composite of claim 1.

6. The composite of claim 1, wherein the composite exhibits an average void volume fraction (VVF) of less than 2%.

7. A composite comprising a combination of a self-healing polymer matrix and a fiber reinforcement, wherein the composite fiber consists of carbon fiber, wherein the composite is fabricated from an intermediate prepreg material, wherein the composite does not comprise microcapsules containing a healing agent nor hollow glass fibers containing a healing agent, and wherein the carbon-fiber areal weight (FAW) of the intermediate prepreg material is between 146-150 g/m² and wherein the polymer content of the intermediate prepreg material is 34-35 wt %.

8. The composite of claim 7, wherein the polymer comprises a polybutadiene graft copolymer.

9. The composite of claim 8, wherein the polybutadiene graft copolymer comprises poly(butadiene)-graft-poly(methyl acrylate-co-acrylonitrile).

10. A structural component for a vehicle comprising the composite of claim 7.

11. The composite of claim 7, wherein the composite exhibits an average void volume fraction (VVF) of less than 2%.

12. The composite of claim 7, wherein the composite exhibits an average fiber volume fraction (FVF) of greater than 60%.

* * * * *